(12) United States Patent
Arai et al.

(10) Patent No.: US 7,378,381 B2
(45) Date of Patent: *May 27, 2008

(54) FLOOR COATING COMPOSITION AND FLOOR COATING COMPOSITION ADDITIVE

(75) Inventors: Zenichi Arai, Tokyo (JP); Jun Iizuka, Nagoya (JP); Tomoaki Ogata, Yokohama (JP); Shigeo Ueda, Kuwana (JP)

(73) Assignee: Rohm and Haas Company, Philadelphia, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/408,530

(22) Filed: Apr. 21, 2006

(65) Prior Publication Data

US 2006/0236892 A1 Oct. 26, 2006

(30) Foreign Application Priority Data

Apr. 25, 2005 (JP) ............................ 2005-126420

(51) Int. Cl.
*C11D 1/83* (2006.01)
*C11D 1/68* (2006.01)
*C11D 3/37* (2006.01)
*C11D 3/43* (2006.01)
*C09G 1/04* (2006.01)

(52) U.S. Cl. ...................... 510/214; 510/434; 510/475; 510/477; 510/488; 510/505; 528/271; 106/3; 106/11

(58) Field of Classification Search ................ 510/214, 510/434, 475, 477, 488, 505; 528/271; 106/3, 106/11
See application file for complete search history.

(56) References Cited

U.S. PATENT DOCUMENTS

| | | | |
|---|---|---|---|
| 3,328,325 A | 6/1967 | Zdanowski | |
| 3,467,610 A | 9/1969 | Fiarman et al. | |
| 3,554,790 A | 1/1971 | Gehman et al. | |
| 3,573,329 A | 3/1971 | Lynn | |
| 3,711,436 A | 1/1973 | Oliver | |
| 3,808,036 A | 4/1974 | Zdanowski | |
| 4,150,005 A | 4/1979 | Gehman et al. | |
| 4,517,330 A | 5/1985 | Zdanowski et al. | |
| 5,149,745 A | 9/1992 | Owens et al. | |
| 5,319,018 A | 6/1994 | Owens et al. | |
| 5,574,090 A | 11/1996 | Gray et al. | |
| 5,676,741 A | 10/1997 | Gray et al. | |
| 5,698,592 A | 12/1997 | Kim et al. | |
| 2006/0241009 A1 * | 10/2006 | Kohr ..................... 510/475 |

FOREIGN PATENT DOCUMENTS

| | | |
|---|---|---|
| EP | 0585981 | 3/1994 |
| EP | 585981 * | 6/1997 |
| JP | 59-206476 A | 11/1984 |
| JP | 6-080933 A | 3/1994 |
| JP | 11-315255 | 11/1999 |
| JP | 2003238307 * | 8/2003 |
| JP | 2004149435 | 5/2004 |
| JP | 2005-154717 | 6/2005 |

* cited by examiner

*Primary Examiner*—Brian P Mruk
(74) *Attorney, Agent, or Firm*—Thomas D. Rogerson

(57) ABSTRACT

To provide a floor coating composition and floor coating composition additive. It is possible to improve the leveling performance, mopping performance, and other properties of a floor coating composition over those obtained with a conventional tributoxyethyl phosphate leveling agent by adding to a floor coating composition 1) a (C7-C10) aliphatic monocarboxylic acid monoester of a diol, or 2) a (C7-C10) aliphatic monocarboxylic acid monoester or diester of a triol.

5 Claims, No Drawings

1

FLOOR COATING COMPOSITION AND FLOOR COATING COMPOSITION ADDITIVE

CROSS REFERENCE TO RELATED PATENT APPLICATIONS

This is a non-provisional application of prior pending JP Patent Application Number 590002035 filed on Apr. 25, 2005.

FIELD OF INVENTION

The present invention relates to a floor coating composition and a floor coating composition additive.

BACKGROUND

Tributoxyethyl phosphate is used as a plasticizer and leveling agent in conventional floor coating compositions. However, tributoxyethyl phosphate contains phosphorus; therefore, it is environmentally undesirable because when the tributoxyethyl phosphate is mixed with a floor coating composition, the waste water contains phosphorus. Moreover, organophosphorus compounds, particularly those materials that are used as pesticides, are neurotoxic substances, and today's social climate does not favor the use of organophosphorus compounds. Therefore, there is a demand for phosphorus-free plasticizers and leveling agents as substitutes for tributoxyethyl phosphate.

A polyalkoxylate of a linear aliphatic alcohol is cited in JP (Kokai) 59-206476 as a substitute for tributoxyethyl phosphate as a leveling agent for a floor coating composition. The use of adipic acid esters as leveling agents is cited in JP (Kokai) 6-80933. Coumarin and derivatives thereof are cited as leveling agents in 11-315255. Moreover, improvement of the leveling performance by a combination of a plasticizer with a specific structure and a polyoxyalkylene alkyl ether-type nonionic surfactant is cited in JP (Kokai) 2004-107586.

[Patent Reference 1] JP (Kokai) 59-206476
[Patent Reference 2] JP (Kokai) 6-80933
[Patent Reference 3] (JP (Kokai) 11-315255
[Patent Reference 4] JP (Kokai) 2004-107586

STATEMENT OF INVENTION

However, when the inventors and others studied the above-mentioned conventional leveling agents, this effect was unsatisfactory in comparison to the effect of tributoxyethyl phosphate. Therefore, an object of the present invention is to provide a floor coating composition having, among its advantages, the same or better leveling performance as a floor coating composition containing tributoxyethyl phosphate. In addition, an object of the present invention is to provide a floor coating composition additive that is capable of imparting to a floor coating composition advantages that include the same or better leveling performance as those imparted by tributoxyethyl phosphate.

The present invention provides as a first embodiment a floor coating composition comprising 1) a (C7-C10) aliphatic monocarboxylic acid monoester of a diol, or 2) a (C7-C 10) aliphatic monocarboxylic monoester or diester of a triol. The present invention provides as a second embodiment a floor coating composition additive comprising 1) a (C7-C10) aliphatic monocarboxylic monoester of a diol or 2) a (C7-C10) aliphatic monocarboxylic monoester or diester of a triol. The present invention provides as a third embodiment a method for improving the leveling performance of a floor coating composition comprising adding to the floor coating composition 1) a (C7-C10) aliphatic monocarboxylic acid monoester of a diol or 2) a (C7-C10) aliphatic monocarboxylic acid monoester or diester of a triol.

The floor coating composition of the present invention has an advantage in that it has excellent leveling performance, mopping performance, and other properties as a result of containing a 1) (C7-C10) aliphatic monocarboxylic acid monoester of a diol or 2) a (C7-C10) aliphatic monocarboxylic acid monoester or diester of a triol. In particular, it has an advantage in that it is possible to improve the leveling performance, mopping performance, and other properties of a floor coating composition by using less of 1) a (C7-C10) aliphatic monocarboxylic acid monoester of a diol or 2) a (C7-C10) aliphatic monocarboxylic acid monoester or diester of a triol when compared to tributoxyethyl phosphate.

DETAILED DESCRIPTION

The floor coating composition of the present invention comprises 1) a (C7-C10) aliphatic monocarboxylic acid monoester of a diol, or 2) a (C7-C10) aliphatic monocarboxylic monoester or diester of a triol. The total amount of 1) a (C7-C10) aliphatic monocarboxylic acid monoester of a diol and 2) a (C7-C10) aliphatic monocarboxylic monoester or diester of a triol contained in the floor coating composition of the present invention is 0.005 to 50 parts by weight, preferably 0.01 to 20 parts by weight, based on 100 parts by weight of polymer solids in the floor coating composition.

The (C7-C10) aliphatic monocarboxylic acid monoester of a diol of the present invention can be a mixture of multiple esters having different diol moieties that form the monoester in question and/or the (C7-C10) aliphatic monocarboxylic acid components that form the monoester in question. Similarly, the (C7-C10) aliphatic monocarboxylic acid monoester or diester of a triol can be a mixture of multiple esters having different triol moieties that form the monoester or diester in question and/or (C7-C10) aliphatic monocarboxylic acid moieties that form the monoester or diester in question. It is also possible to simultaneously use both 1) a (C7-C10) aliphatic monocarboxylic monoester of a diol and 2) a (C7-C10) aliphatic monocarboxylic acid monoester or diester of a triol.

When a (C7-C10) aliphatic monocarboxylic monoester or diester of a triol is used in the present invention, it is possible to use only one of or both the monoester and diester.

Moreover, there are no special restrictions to the ratio of the monoester and diester when both the monoester and the diester are used.

The (C7-C10) aliphatic monocarboxylic acid monoester of a diol and the (C7-C10) aliphatic monocarboxylic acid monoester or diester of a triol used in the present invention can both be compounds that have been produced by a conventional method as needed, or they can be commercial products. Unless contrary to the object of the present invention, the floor coating composition and the floor coating composition additive of the present invention can also contain the byproducts that are produced during the production of a (C7-C10) aliphatic monocarboxylic acid monoester of a diol or a (C7-C10) aliphatic monocarboxylic acid monoester or diester of a triol. For instance, there are times when a diester is formed during the production of a (C7-C10) aliphatic monocarboxylic acid monoester of a diol, and this diester can be contained in the floor coating composition of the present invention. When a mixture of a (C7-C10) aliphatic monocarboxylic acid monoester and diester of a triol is used in the present invention, the amount of monoester in this mixture should be 60 mol % or greater, preferably 80 mol % or greater, more preferably 90 mol % or greater. Ideally the ester is 100 mol % of the monoester form, that is, the ester does not contain the diester. In addition, there are times when a triester is formed when producing the (C7-C10) aliphatic monocarboxylic acid monoester or diester of a triol, and the floor coating composition of the present invention can contain this triester. When the (C7-C10) aliphatic monocarboxylic acid monoester and/or diester of a triol is used in the present invention as a mixture with the triester, the total amount of the monoester and diester in the mixture should be 60 mol % or greater, preferably 80 mol % or greater, more preferably 90 mol % or greater. Ideally the total amount of monoester and diester is 100 mol %, that is, there is no triester component. When a byproduct is simultaneously produced during the production of the ester that is used in the present invention, the desired ester can also be used according to the present invention following removal or reduction of this byproduct as necessary.

There are no special restrictions to the diol or triol of the present invention, and conventional diols and triols can be used as needed. The diol preferably has a molecular weight of 5,000 or less, more preferably a molecular weight of 1,000 or less. Specific examples of preferred diols are ethylene glycol, diethylene glycol, triethylene glycol, propylene glycol, dipropylene glycol, and tripropylene glycol. The triol preferably has a molecular weight of 5,000 or less, more preferably 1,000 or less. Specific examples of preferred triols are glycerol and trimethylolpropane. There are no special restrictions to the (C7-C10) aliphatic monocarboxylic acid of the present invention as long as it is an aliphatic monocarboxylic acid with 7 to 10 carbons. It can have either a linear or a branched structure. The aliphatic monocarboxylic acid is preferably a (C8-C9) aliphatic monocarboxylic acid, particularly a branched (C8-C9) aliphatic monocarboxylic acid. Ideally, the acid is isononanoic acid (3,5,5-trimethylhexanoic acid) or octylic acid (2-ethylhexanoic acid).

The phrase "floor coating composition" of the present invention refers to a composition such as a floor polish composition or a floor sealer composition; these are also called floor care compositions in this technical field. The phrase "floor polish composition" refers to a composition for forming a film that can be stripped from the floor by a stripping agent or the like. The phrase "floor sealer composition" essentially refers to a composition for forming a film that is difficult to strip from a floor, but can also be used to protect flooring, such as a floor polish composition.

The floor coating composition of the present invention preferably contains an aqueous suspension or dispersion of one or more water-insoluble emulsion polymers having acid functional residues, and contains a polyvalent metal ion or complex cross-linking agent as needed. Examples of such water-insoluble emulsion polymers are disclosed in U.S. Pat. Nos. 3,328,325, 3,467,610, 3,554,790, 3,573,329, 3,711,436, 3,808,036, 4,150,005, 4,517,330, 5,149,745, 5,319,018, 5,574,090, and 5,676,741.

Ideally, the water-insoluble emulsion copolymer has a Tg of at least 10° C., particularly at least 40° C. (The Tg was calculated using the Fox equation, $1/Tg=WA/TgA+WB/TgB$, where Tg is the glass transition temperature (° K), TgA and TgB are the glass transition temperatures of homopolymers A and B, and WA and WB are the percent by weight of components A and B of the copolymer, respectively (T. G. Fox, Bull. Am. Phys. Soc. 1, 123, 1956)).

Preferably, the water-insoluble polymer is produced from a monomer mixture comprising 0 to 70% by weight, particularly 10 to 50% by weight, of at least one vinyl aromatic monomer; 3 to 50% by weight, particularly 5 to 20% by weight, of at least one acidic monomer; and 97% by weight or less, particularly 30 to 97% by weight, ideally 30 to 70% by weight, of at least one monomer selected from (C1-C20) alkyl(meth)acrylates, preferably (C1-C12) alkyl (meth)acrylates.

Preferably, the vinyl aromatic monomer is an alpha- or beta-ethylenic unsaturated aromatic monomer, particularly one selected from the group consisting of styrene, vinyltoluene, 2-bromostyrene, o-bromostyrene, p-chlorostyrene, o-methoxystyrene, p-methoxystyrene, allylphenyl ether, allyltoluyl ether, and alpha-methylstyrene.

Preferably, the acid monomer is an alpha or beta-monoethylenic unsaturated acid, particularly one selected from the group consisting of maleic acid, fumaric acid, aconitic acid, crotonic acid, citraconic acid, acryloxypropionic acid, acrylic acid, methacrylic acid, and itaconic acid. Methacrylic acid is ideal. Examples of other monoethylenic unsaturated acid monomers that can be copolymerized in order to form a water-insoluble film-forming polymer are partial esters of unsaturated aliphatic dicarboxylic acids and alkyl half-esters of such acids. Specific examples include alkyl half-esters of itaconic acid, fumaric acid, or maleic acid having alkyl groups with one to six carbon atoms, such as methyl itaconate, butyl itaconate, ethyl fumarate, butyl fumarate, and methyl maleate.

The monomer mixture contains 97% by weight or less of at least one monomer selected from the group consisting of methyl methacrylate, methyl acrylate, ethyl acrylate, ethyl methacrylate, n-butyl acrylate, butyl methacrylate, isobutyl methacrylate, 2-ethylhexylacrylate, n-octyl acrylate, sec-butyl acrylate, cyclopropyl methacrylate, acetacetoxyethyl acrylate, acetacetoxyethyl methacrylate, acetacetoxypropyl acrylate, acetacetoxypropyl methacrylate, acetacetoxybutyl acrylate, acetacetoxybutyl methacrylate, 2,3-di(acetacetoxy) propyl acrylate, 2,3-di(acetacetoxy)propyl methacrylate, and allylacetoacetate.

The monomer mixture can also contain 0 to 40% by weight of at least one polar or partially polar hydrophilic monomer that will not form ions, such as acrylonitrile, methacrylonitrile, cis- or trans-crotononitrile, alpha-cyanostyrene, alpha-chloroacrylonitrile, ethyl vinyl ether, isopropyl vinyl ether, isobutyl or butyl vinyl ether, diethylene glycol vinyl ether, decyl vinyl ether, vinyl acetate, isobornyl methacrylate; 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, 2-hydroxypropyl methacrylate, and other hydroxyalkyl(meth)acrylates; and 2-mercaptopropylmethacrylate, 2-sulfoethylene methacrylate, methyl vinyl thioether, propyl vinyl thioether, and other vinyl thiols.

The acid moiety of the ester of the monomer mixture can also contain 0 to 10% by weight of at least one monomeric vinyl ester selected from the group consisting of aromatic and (C1 to C18) aliphatic acids. Examples of these acids are formic acid, acetic acid, propionic acid, n-butyric acid, n-valeric acid, palmitic acid, stearic acid, phenylacetic acid, benzoic acid, chloroacetic acid, dichloroacetic acid, gamma-chlorobutyric acid, 4-chlorobenzoic acid, 2,5-dimethylbenzoic acid, o-toluic acid, 2,4,5-trimethoxybenzoic acid, cyclobutanecarboxylic acid, cyclohexanecarboxylic acid, 1-(p-methoxyphenyl)cyclohexanecarboxylic acid, 1-(p-toluyl)-1-cyclopentanecarboxylic acid, hexanoic acid, myristic acid, and p-toluic acid. The hydroxyvinyl moiety of the monomer can be selected from hydroxyethylene, 3-hydroxypenta-1-ene, 3,4-dihydroxybuta-1-ene, 3-hydroxypenta-1-ene, and other hydroxyvinyl compounds. Such derivatives cannot actually be prepared from a precursor compound such as acetic acid and hydroxyethylene and are understood to be purely a formality, as in the case of vinyl acetate monomer that is considered to be derived from acetic acid and hydroxyethylene.

The water-dispersible water-insoluble polymer is prepared by a conventional method. The actual emulsion polymerization is described in detail in D. C. Blackley, Emulsion Polymerization (Wiley, 1975). A latex polymer is formed by using an internally plasticized polymer emulsion. Preparation of an internally plasticized polymer emulsion is described in detail in U.S. Pat. No. 4,150,005, and preparation of a non-internally plasticized floor coating emulsion polymer is described in U.S. Pat. Nos. 3,573,239, 3,328,325, 3,554,790, and 3,467,610.

Conventional emulsion polymerization technology can be used to prepare the polymer latex. That is, the monomer is emulsified by an anionic or nonionic dispersant. It is preferred that the amount of dispersant that is used is approximately 0.5% to 10% of the total weight of the monomer. The acid monomer is water soluble and acts as a dispersant that facilitates emulsion of the other monomers that are used. A free radical-type polymerization initiator, such as ammonium or potassium persulfate, can be used alone, or can be used together with a promoter such as potassium metabisulfate or sodium thiosulfate. The initiator and promoter are generally referred to as catalysts, and each can be used at a ratio of 0.1 to 2% based on the weight of the monomers to be copolymerized. The polymerization temperature is generally from, for instance, room temperature to 90° C. or higher.

Examples of emulsifiers that are used for emulsion polymerization are alkali metal and ammonium salts of alkyl, aryl, alkaryl, and aralkyl sulfonates, sulfates, and polyether sulfates, such as sodium vinyl sulfonate and sodium methallylsulfonate; the corresponding phosphates and phosphonates, such as posphoethyl methacrylate; and alkoxylated fatty acids, esters, alcohols, amines, amides, and alkylphenols.

There are cases in which a chain transfer agent, such as a mercaptane, polymercaptane, or polyahalogen compound, should be contained in the mixture to be polymerized in order to control polymer molecular weight.

The floor coating composition preferably contains a water-insoluble polymer as defined by any of the above-mentioned embodiments, at least one polyvalent metal ion or complex cross-linking agent in an amount that is equivalent to 0 to 100% of the acid residues in the polymer, and at least one basic hydroxyl group or alkali metal salt such as cited in U.S. Pat. No. 4,517,330 as needed. The polyvalent metal is preferably a transition metal. The floor coating composition is preferably one wherein the amount of the transition metal ion or complex cross-linking agent is equivalent to 25 to 80% of the acid residues in the polymer, and/or the ratio of the transition metal to the alkali metal is 1.0:0.25 to 1.0:2.0. A composition is particularly preferred wherein the amount of the transition metal is equivalent to 30 to 70% of the acid residues in the polymer, and/or the molar ratio of the transition metal to the alkali metal is 1.0:0.5 to 1.0:1.5.

A conventional polyvalent alkali metal ion or complex cross-linking agent can be used in the present invention. These are disclosed in, for instance, U.S. Pat. Nos. 3,328,325, 3,467,610, 3,554,790, 3,573,329, 3,711,436, 3,808,036, 4,150,005, 4,517,330, 5,149,745, and 5,319,018. Preferred polyvalent metal complexes are diammonium zinc (II) and tetraammonium zinc (II) ions, cadmium glycinate, nickel glycinate, zinc glycinate, zirconium glycinate, zinc alanate, copper beta-alanate, zinc beta-alanate, zinc valanate, and copper bis-dimethylaminoacetate.

The polyvalent alkali metal ion or complex cross-linking agent is freely soluble in aqueous solvents of the floor coating composition, particularly within a pH range of 6.5 to 10.5. Nevertheless, when a coating composition containing these compounds dries, a coating is formed that is essentially insoluble in water but can be removed. The polyvalent metal complex can also be added as a solution to the water-insoluble film-forming polymer latex. This can be accomplished by dissolving the metal complex in an alkali solution, such as dilute ammonia. Ammonia forms a complex with polyvalent metal compounds; therefore, when a compound such as cadmium glycinate is dissolved in aqueous ammonia, it is called cadmium ammonia glycinate. The above-mentioned other polyvalent metal complexes are also similarly named.

In order to be acceptable, the polyvalent metal complex must be stable in alkali solutions. However, an excessively stable complex is undesirable because dissociation of metal ions during film formation by the floor coating composition will be delayed. The floor coating composition should have a minimum film-forming temperature (MFT) of less than 100° C., preferably less than 80° C. The polyvalent metal ion and complex cross-linking agent can be added to the floor coating composition during any step of compounding. 1) The (C7-C10) aliphatic monocarboxylic acid monoester of a diol, or 2) the (C7-C10) aliphatic monocarboxylic monoester or diester of a triol can be added to the floor coating composition during any step of compounding. Similarly, the basic salt of an alkali metal can be added to the polyvalent metal ion and the complex cross-linking agent during any step of compounding.

Preferably, the floor coating composition of the present invention comprises the following primary components: a) 10 to 100 parts by weight of a water-insoluble polymer in terms of solids (this water-insoluble polymer can be pre-cross-linked with a polyvalent metal complex and/or alkali metal basic salt, or can be cross-linked later); b) 0 to 90 parts by weight of a wax emulsion in terms of solids; c) 0 to 90 parts by weight of an alkali-soluble resin (ASR) in terms of solids; d) a lubricant, emulsifier, dispersant, defoaming agent, ultraviolet brightener, film-forming solvent, and other additives in an amount of 0.01 to 20 parts by weight per 100 parts by weight of polymer solids so that a floor coating film is formed at the temperature that is used; f) 1) a (C7-C10) aliphatic monocarboxylic acid monoester of a diol, or 2) a (C7-C10) aliphatic monocarboxylic monoester or diester of a triol in an amount of 0.005 to 50 parts, preferably 0.01 to 20 parts, per 100 parts by weight of polymer; and e) enough water to bring the total solid content of the composition to 0.5% to 45%, preferably 5% to 30%. The total of a), b), and c) is 100 parts by weight in the above-mentioned percentages. Moreover, component f) is not included in component d) in the above-mentioned percentages. Unless otherwise specified, the cases throughout the present Specification where the above-mentioned percentage ranges include a "0" for certain components of a certain composition signify that the component is an optional component that can be added or can be omitted.

When c) is present, the amount of c) is no more than 100% by weight of a), preferably 3 to 25% by weight of a). A satisfactory floor coating composition can be prepared without an ASR. Similarly, the ASR is not an essential component of a durable floor coating composition. The total cost of the composition is reduced and the leveling performance and brightness are improved, depending on the characteristic properties of the floor coating vehicle composition and other materials d) and f) in the composition. Furthermore, depending on the quality of ASR and the final balance in properties desired by the person compounding the floor coating, any ASR can be added in order to appropriately reduce the total cost of the composition, to improve the leveling performance and gloss, and to increase the sensitivity of the floor composition to alkali strippers, taking into consideration the characteristic properties of the floor coating vehicle composition and other additives d) and f).

Conventional lubricants, emulsifiers, dispersants, defoaming agents, ultraviolet brighteners, and film-forming solvents can be used in conventional amounts in accordance with the balance of properties desired by the person compounding the composition. The floor coating composition can also contain as needed fragrances and odor-masking agents, dyes and coloring agents, bactericides and bacteriostatic agents, and other additives. The floor coating composition can also contain leveling agents and plasticizers other than 1) the (C7-C10) aliphatic monocarboxylic acid monoester of a diol and 2) the (C7-C10) aliphatic monocarboxylic monoester or diester of a triol.

Another embodiment of the present invention is a floor coating composition additive that contains 1) a (C7-C10) aliphatic monocarboxylic acid monoester of a diol, or 2) a (C7-C10) aliphatic monocarboxylic monoester or diester of a triol. The floor coating composition additive of the present invention can be added to the floor coating composition at any time and by any method. Moreover, the amount in which the floor coating composition additive is added to a floor coating composition should be such that the amount of ester is within the above-mentioned range. The floor coating composition additive of the present invention must contain this ester, and it can also contain a medium and other substances as needed. There are no special restrictions to this medium, but one capable of stably supporting the ester is preferred.

1) The (C7-C10) aliphatic monocarboxylic acid monoester of a diol, or 2) the (C7-C10) aliphatic monocarboxylic monoester or diester of a triol can act as a leveling agent or plasticizer in the floor coating composition. Therefore, the present invention also includes as an embodiment a leveling agent or plasticizer comprising 1) a (C7-C10) aliphatic monocarboxylic acid monoester of a diol, or 2) a (C7-C10) aliphatic monocarboxylic monoester or diester of a triol.

Another embodiment of the present invention is a method for improving the leveling performance of a floor coating composition that comprises adding to the floor coating composition 1) a (C7-C10) aliphatic monocarboxylic acid monoester of a diol, or 2) a (C7-C10) aliphatic monocarboxylic monoester or diester of a triol.

This ester can be added at any time and by any method to the floor coating composition. Moreover, the amount in which the ester is added to the floor coating composition should be enough to improve the leveling performance of the floor coating composition, that is, 0.005 to 50 parts by weight, preferably 0.01 to 20 parts by weight, based on 100 parts by weight of the polymer solids contained in the floor coating composition. The present invention will now be described in specific terms with working examples, but the present invention is not limited to these working examples.

[Working Examples]

Test 1. Improvement of Properties of Floor Coating Composition by Using Monoester Form.

Floor coating compositions containing the nonanoic acid monoester of diethylene glycol as a leveling agent (Working Examples 1 through 5), a floor coating composition containing the octylic acid monoester of diethylene glycol as the leveling agent (Working Example 6), and a floor coating composition that did not contain a leveling agent (Comparative Example 1) were prepared and their properties compared. The components and amounts contained in the floor coating compositions of Working Examples 1 through 6 and Comparative Example 1 are shown in Table 1. The numbers in the columns other than for the leveling agent (%) in Table 1 are the weight (g) of the component used. The preparation method involved introducing a stirrer to a 200 mL glass beaker and adding the components shown in Table 1 in the same order as shown in Table 1 under stirring. Stirring was continued for one hour after all the components had been added to complete the floor coating composition.

The leveling agent used in Working Examples 1 through 5 was a mixture of the isononanoic acid monoester of diethylene glycol and the isononanoic acid diester of diethylene glycol (DEG-C9 in Table 1), and the molar ratio of the isononanoic acid monoester of diethylene glycol and the isononanoic acid diester of diethylene glycol is shown in the row "Leveling Agent (%)" in Table 1. That is, the "90/10" for Working Example 1 under "Leveling Agent (%)" in Table 1 means that the molar ratio of the isononanoic acid monoester of diethylene glycol and the isononanoic acid diester of diethylene glycol was 90/10. Moreover, the leveling agent that was used in Working Example 6 was a mixture of the octylic acid monoester of diethylene glycol and the octylic acid diester of diethylene glycol (DEG-C8 in Table 1), and the monoester/diester ratio was 75/25.

TABLE 1

| Floor Coating Composition | Working Example 1 | Working Example 2 | Working Example 3 | Working Example 4 | Working Example 5 | Working Example 6 | Comparative Example 1 |
|---|---|---|---|---|---|---|---|
| Water (g) | 43.51 | 43.51 | 43.51 | 43.51 | 43.51 | 43.51 | 43.51 |
| Primal 1531B (g) | 2.39 | 2.39 | 2.39 | 2.39 | 2.39 | 2.39 | 2.39 |
| Lodyne S-100 (g) | 1.47 | 1.47 | 0 | 1.47 | 1.47 | 1.47 | 1.47 |
| Diethylene glycol monoethyl ether (g) | 3.64 | 3.64 | 3.64 | 3.64 | 3.64 | 3.64 | 3.64 |
| Dipropylene glycol monomethyl ether (g) | 1.73 | 1.73 | 1.73 | 1.73 | 1.73 | 1.73 | 1.73 |
| Texanol (g) | 0.84 | 0.84 | 0.84 | 0.84 | 0.84 | 0.84 | 0.84 |
| Leveling agent (%) | DEG-C9 (90/10) | DEG-C9 (80/20) | DEG-C9 (80/20) | DEG-C9 (70/30) | DEG-C9 (60/40) | DEG-C8 (75/25) | None |
| Leveling agent (g) | 1.17 | 1.17 | 1.17 | 1.17 | 1.17 | 1.17 | 0 |

TABLE 1-continued

| Floor Coating Composition | Working Example 1 | Working Example 2 | Working Example 3 | Working Example 4 | Working Example 5 | Working Example 6 | Comparative Example 1 |
|---|---|---|---|---|---|---|---|
| Duraplus 2 (g) | 38.36 | 38.36 | 38.36 | 38.36 | 38.36 | 38.36 | 38.36 |
| E-4000 (g) | 6.84 | 6.84 | 6.84 | 6.84 | 6.84 | 6.84 | 6.84 |
| FS antifoam 013 (g) | 0.02 | 0.02 | 0.02 | 0.02 | 0.02 | 0.02 | 0.02 |

The following are the components in Table 1. Primal 1531B is an acrylic polymer emulsion produced by Rohm and Haas Company; Lodyne S-100 is a fluorine surfactant produced by Ciba Specialty Chemicals; Duraplus 2 is an acrylic polymer emulsion produced by Rohm and Haas Company; E-4000 is a wax emulsion produced by Toho Chemical Industry Co., Ltd.;

FS antifoam 013 is a defoaming agent produced by Dow Corning Corporation; DEG-C9 is a mixture of the isononanoic acid monoester of diethylene glycol and the isononanoic acid diester of diethylene glycol; and DEG-C8 is a mixture of the octylic acid monoester of diethylene glycol and the octylic acid diester of diethylene glycol.

The floor coating composition that was prepared was applied to a 30 cm×30 cm vinyl chloride floor tile such that wet film thickness was 10 mL/m$^2$ using the industrial paper wipers Kimwipe S-200 (120×150 mm) as the application means. Mopping performance was evaluated during application. The film surface of the floor coating composition was allowed to dry for one week at room temperature. After drying, the leveling performance, gloss, heel mark resistance (black heel mark resistance, scuff resistance), water resistance, detergent resistance, stripping performance, and adhesion were each evaluated once. The evaluation methods used for each of the properties are described below.

Mopping performance: The mopping performance is the ease of application of the floor coating composition to a floor tile by hand using a paper wiper as evaluated based on the sense of resistance experienced by the person applying the composition. The evaluation criteria were as follows. Mopping performance was excellent when there was no sense of resistance at all when the polish was applied; good when there was virtually no sense of resistance when the polish was applied; average when there was some sense of resistance when the polish was applied; and poor when there was a sense of resistance when the polish was applied.

Leveling performance: The leveling performance was evaluated essentially in accordance with JIS K3920 and ASTM D3052. That is, cross (x) marks were made as an indicator of the leveling performance once the polish had been applied. The cross marks were macroscopically checked after the film had dried, and the leveling performance was evaluated as follows. The leveling performance was excellent when no cross marks were seen; good when some cross marks could be seen but there were no protrusions in the film; average when cross marks could be seen and protrusion in the paint film was observed; and poor when there were obvious cross marks and protrusion in the paint film was observed.

Gloss: Gloss was evaluated in accordance with JIS K3920 and ASTM D1455. That is, once the film had dried, gloss (20°; 60°) was measured using a gloss meter (BYK Gardner (micro-TRI gloss)) and evaluated as follows. Gloss was excellent when the meter reading was 90° or greater; good when the meter reading was less than 90° but 80° or greater; average when the meter reading was less than 80° but 70° or greater; and poor when the meter reading was less than 70°.

Heel mark resistance (black heel mark resistance, scuff resistance): Black heel mark resistance was evaluated essentially in accordance with JIS K3920 and ASTM D3052. That is, a white homogenous tile was used. The film was dried and the coated tile was loaded on a heel mark tester and tested for a predetermined time. Then the ratio of the black heel marks (BHM) and scuff (Scuff) marks present was macroscopically checked. The evaluation was excellent when there were no black heel marks or scuff marks at all; good when there were a few black heel marks and scuff marks; average when there were black heel marks and scuff marks; and poor when there were many black heel marks and scuff marks.

Water resistance: Water resistance was evaluated essentially in accordance with JIS K3920 and ASTM D1793. That is, once the film had dried, 1 mL of water was allowed to fall onto the floor in drops and left for one hour. Changes in the film after the water had been absorbed and the moisture had dried were macroscopically evaluated as follows. Water resistance was excellent when there were no changes in the film at all; good when there were virtually no changes in the film; average when there were some changes in the film; and poor when the film broke up or turned white.

Detergent resistance: Detergent resistance was evaluated essentially in accordance with JIS K3920 and ASTM D3207. That is, a specific amount of a standard washing solution was poured into a washability machine and the film was washed for a specific time. Then the film was macroscopically checked for any loss. Detergent resistance was excellent when no changes in the film were observed at all; good when virtually no changes in the film were observed; average when some loss of film was observed and the substrate underneath the film could be seen; and poor when there was loss of film and the substrate underneath could be seen.

Stripping performance: Stripping performance was evaluated essentially in accordance with JIS K3920 and ASTM D1792. That is, a specific amount of a standard stripping agent was poured into a washability machine, the coating was washed for a specific amount of time, and the coating was macroscopically checked for signs of being stripped. Stripping performance was excellent when the coating was completely removed; good when a small amount of coating remained; average when some of the coating remained; and poor if none of the coating had been stripped.

Adhesion (tape adhesion): Adhesion was evaluated essentially in accordance with JIS A5536. That is, a predetermined adhesive tape was applied to the coating, and the percentage of coating that remained when the tape was peeled from a right angle to the coating was measured. Adhesion was excellent when the percentage of coating remaining was 90% or more; good when the percentage remaining was 80% or more but less than 90%; average when the percentage remaining was 60% or greater but less than 80%; and poor when the percentage remaining was less than 60%.

Mopping performance, leveling performance, gloss, and heel mark resistance of Working Examples 1 through 6 and Comparative Example 1 are shown in Table 2.

TABLE 2

| Properties | Working Example 1 | Working Example 2 | Working Example 3 | Working Example 4 | Working Example 5 | Working Example 6 | Comparative Example 1 |
|---|---|---|---|---|---|---|---|
| Mopping performance | Good | Good | Good | Average to good | Average | Average | Average |
| Leveling performance | Good | Good | Good | Average to good | Average to good | Average | Poor to average |
| Gloss | Good | Good | Good | Good | Good | Good | Poor |
| Heel mark resistance | Good | Good | Good | Good | Good | Good | Poor to average |

Mopping performance, leveling performance, gloss, and heel mark resistance were all improved in Working Examples 1 through 6, which were floor coating compositions of the present invention containing the nonanoic acid monoester of diethylene glycol or the octylic acid monoester of diethylene glycol, when compared to Comparative Example 1, which was a floor coating composition that did not contain these monoesters. Although not shown in Table 2, there was no difference between Working Examples 1 through 6 and Comparative Example 1 in terms of water resistance, detergent resistance, stripping performance, and adhesion. It is clear from the above-mentioned results that the nonanoic acid monoester of diethylene glycol or the octylic acid monoester of diethylene glycol can improve the mopping performance, the leveling performance, gloss, and heel mark resistance of the floor coating composition.

Moreover, improvement of mopping performance and leveling performance was seen with an increase in the proportion of the monoester form, that is, the isononanoic acid monoester of the diethylene glycol, in the ester mixture used as the leveling agent. It became clear that the monoester form of the diol in the ester mixture is useful in improving the properties of the floor coating composition. Moreover, as is clear from Working Examples 2 and 3, using the present invention is advantageous even if the floor coating composition contains no fluorine surfactant. A fluorine surfactant generally makes the coating compatible with the substrate and is useful with floor coating compositions. Nevertheless, it was clear that when the leveling agent of the present invention is used, compatibility can be maintained without using the fluorine surfactant.

Test 2. Comparison with Tributoxyethyl Phosphate

The properties of a floor coating composition containing the nonanoic acid monoester of diethylene glycol as the leveling agent (Working Examples 1 and 2) were compared with those of a floor coating composition containing tributoxyethyl phosphate as the leveling agent (Comparative Example 2). Preparation of the floor coating composition and evaluation of the properties were conducted as in Test 1. The results of Working Examples 1 and 2 are cited in Test 1. The components and amounts contained in the floor coating composition are shown in Table 3, and the properties are shown in Table 4.

TABLE 3

| Floor coating composition | Working Example 1 | Working Example 2 | Comparative Example 2 |
|---|---|---|---|
| Water (g) | 43.51 | 43.51 | 43.51 |
| Primal 1531B (g) | 2.39 | 2.39 | 2.39 |
| Lodyne S-100 (g) | 1.47 | 1.47 | 1.47 |
| Diethylene glycol monoethyl ether (g) | 3.64 | 3.64 | 3.64 |
| Dipropylene glycol monomethyl ether (g) | 1.73 | 1.73 | 1.73 |
| Texanol (g) | 0.84 | 0.84 | 0.84 |
| Leveling agent (%) | DEG-C9 (90/10) | DEG-C9 (80/20) | Tributoxyethyl phosphate |
| Leveling agent (g) | 1.17 | 1.17 | 1.17 |
| Duraplus 2 (g) | 38.36 | 38.36 | 38.36 |
| E-4000 (g) | 6.84 | 6.84 | 6.84 |
| FS antifoam 013 (g) | 0.02 | 0.02 | 0.02 |

The following are the components in Table 3. Primal 1531B is an acrylic polymer emulsion produced by Rohm and Haas Company; Lodyne S-100 is a fluorine surfactant produced by Ciba Specialty Chemicals; Duraplus 2 is an acrylic polymer emulsion produced by Rohm and Haas Company; E-4000 is a wax emulsion produced by Toho Chemical Industry Co., Ltd.;

FS antifoam 013 is a defoaming agent produced by Dow Corning Corporation; and DEG-C9 is a mixture of the isononanoic acid monoester of diethylene glycol and the isononanoic acid diester of diethylene glycol.

TABLE 4

| Properties | Working Example 1 | Working Example 2 | Comparative Example 2 |
|---|---|---|---|
| Mopping performance | Good | Good | Average |
| Leveling performance | Good | Good | Good |
| Gloss | Good | Good | Good |
| Heel mark resistance | Good | Good | Good |

Although the total amount of ester in Working Examples 1 and 2 was the same as in Comparative Example 2, the amount in the form of an isononanoic acid monoester of diethylene glycol was less than the amount of tributoxyethyl phosphate used in Comparative Example 1. However, the mopping performance of both Working Examples 1 and 2 was superior to that of Comparative Example 2. Moreover, Working Examples 1 and 2 had the same effect as Comparative Example 2 in terms of the leveling performance, gloss, and heel mark resistance. Moreover, there was no difference between Working Examples 1 and 2 and Comparative Example 2 in terms of water resistance, detergent resistance, stripping performance, and adhesion. It was therefore clear that the isononanoic acid monoester of diethylene glycol can function in a floor coating composition as a leveling agent that is superior to the conventional leveling agent of tributoxyethyl phosphate.

Test 3. Comparison with Other Conventional Leveling Agents

The properties of the floor coating composition of Working Example 1, which contained the isononanoic acid monoester of diethylene glycol as the leveling agent, were compared with the properties of each floor coating composition of Comparative Example 3, which contained an increased amount of Texanol; Comparative Example 4 containing as the leveling agent polyoxyethylene lauryl ether, which is a polyethoxylate of a linear alcohol; Comparative Example 5, which contained Coasol (Dow Chemical Company, mixture of the diisobutyl esters of glutaric acid and adipic acid); and Comparative Example 6 containing as the leveling agent isodecyl benzoate, which is an aromatic ester. The results in Working Example 1 are cited in Test 1. The components and amounts contained in the floor coating composition are shown in Table 5, and the properties are shown in Table 6.

isononanoic acid monoester of diethylene glycol can function in a floor coating composition as a leveling agent that is superior to various conventional leveling agents.

Test 4. Study of Various Ester Forms

A coating composition was prepared in Working Example 7 from the same composition and by the same method as in Working Example 1, with the exception that 1.17 g of an ester mixture of 82 mol % of the isononanoic acid monoester of ethylene glycol and 18 mol % of the isononanoic acid diester of ethylene glycol (represented as EG-C9 in Table 7) was used as the leveling agent, and the leveling performance was evaluated. A coating composition was prepared in Working Example 8 from the same composition and by the same method as in Working Example 1, with the exception that 1.17 g of an ester mixture of 75 mol % of the isononanoic acid monoester of propylene glycol and 25 mol % of the isononanoic acid diester of propylene glycol

TABLE 5

| Floor Coating Composition | Working Example 1 | Comparative Example 3 | Comparative Example 4 | Comparative Example 5 | Comparative Example 6 |
|---|---|---|---|---|---|
| Water (g) | 43.51 | 43.51 | 43.51 | 43.51 | 43.51 |
| Primal 1531B (g) | 2.39 | 2.39 | 2.39 | 2.39 | 2.39 |
| Lodyne S-100 (g) | 1.47 | 1.47 | 1.47 | 1.47 | 1.47 |
| Diethylene glycol monoethyl ether (g) | 3.64 | 3.64 | 3.64 | 3.64 | 3.64 |
| Dipropylene glycol monomethyl ether (g) | 1.73 | 1.73 | 1.73 | 1.73 | 1.73 |
| Texanol (g) | 0.84 | 2.12 | 0.84 | 0.84 | 0.84 |
| Leveling agent (%) | DEG-C9 (90/10) | None | Linear alcohol polyethoxylate | Coasol | Aromatic |
| Leveling agent (g) | 1.17 | 0 | 1.17 | 1.17 | 1.17 |
| Duraplus 2 (g) | 38.36 | 38.36 | 38.36 | 38.36 | 38.36 |
| E-4000 (g) | 6.84 | 6.84 | 6.84 | 6.84 | 6.84 |
| FS antifoam 013 (g) | 0.02 | 0.02 | 0.02 | 0.02 | 0.02 |

The following are the components in Table 1. Primal 1531B is an acrylic polymer emulsion produced by Rohm and Haas Company; Lodyne S-100 is a fluorine surfactant produced by Ciba Specialty Chemicals; Duraplus 2 is an acrylic polymer emulsion produced by Rohm and Haas Company; E-4000 is a wax emulsion produced by Toho Chemical Industry Co., Ltd.;

FS antifoam 013 is a defoaming agent produced by Dow Corning Corporation; and DEG-C9 is a mixture of the isononanoic acid monoester of diethylene glycol and the isononanoic acid diester of diethylene glycol.

(represented as PG-C9 in Table 7) was used as the leveling agent, and the leveling performance was evaluated. A coating composition was prepared in Working Example 9 from the same composition and by the same method as in Working Example 1, with the exception that 1.17 g of an ester mixture of 92 mol % of the octylic acid monoester of ethylene glycol and 8 mol % of the octylic acid diester of ethylene glycol (represented as DEG-C8 in Table 7) was used as the leveling agent, and the leveling performance was evaluated. A coating composition was prepared in Working Example 10 from the same composition and by the same

TABLE 6

| Properties | Working Example 1 | Working Example 3 | Working Example 4 | Working Example 5 | Working Example 6 |
|---|---|---|---|---|---|
| Mopping performance | Good | Average | Average | Average | Average |
| Leveling performance | Good | Poor | Poor to average | Poor to average | Poor |
| Gloss | Good | Poor | Average | Average | Average |
| Heel mark | Good | Poor to average | Good | Good | Good |

Working Example 1 had excellent leveling performance and gloss when compared to any of Comparative Examples 3 through 6. Moreover, there was no difference between Working Example 1 and Comparative Examples 3 through 6 in terms of water resistance, detergent resistance, stripping performance, and adhesion. It is therefore clear that the method as in Working Example 1, with the exception that 1.17 g of an ester mixture of 83 mol % of the octylic acid monoester of propylene glycol and 17 mol % of the octylic acid diester of propylene glycol (represented as PG-C8 in Table 7) was used as the leveling agent, and the leveling performance was evaluated. A coating composition was prepared in Working Example 11 from the same composition and by the same method as in Working Example 1, with the exception that 1.17 g of an ester mixture of 71 mol % of the octylic acid monoester of ethylene glycol and 29 mol % of the octylic acid diester of ethylene glycol (represented as EG-C8 in Table 7) was used as the leveling agent, and the leveling performance was evaluated. Each composition and the leveling performance of Working Examples 7 through 11 are shown in Table 7.

monoester, which is believed to be the active ingredient in improving the leveling performance.

Test 5. Studies of Various Ester Forms (2)

JP-308 (Rohm and Haas Company) was used in place of Duraplus 2 as the acrylic polymer emulsion in Working Examples 12 through 16 and Comparative Examples 7 and 8. The preparation method involved introducing a stirrer to a 200 mL glass beaker and adding the components in Table

TABLE 7

| Floor Coating Composition | Working Example 7 | Working Example 8 | Working Example 9 | Working Example 10 | Working Example 11 |
|---|---|---|---|---|---|
| Water (g) | 43.51 | 43.51 | 43.51 | 43.51 | 43.51 |
| Primal 1531B (g) | 2.39 | 2.39 | 2.39 | 2.39 | 2.39 |
| Lodyne S-100 (g) | 1.47 | 1.47 | 1.47 | 1.47 | 1.47 |
| Diethylene glycol monoethyl ether (g) | 3.64 | 3.64 | 3.64 | 3.64 | 3.64 |
| Dipropylene glycol monomethyl ether (g) | 1.73 | 1.73 | 1.73 | 1.73 | 1.73 |
| Texanol (g) | 0.84 | 0.84 | 0.84 | 0.84 | 0.84 |
| Leveling agent (%) | EG-C9 (82/18) | PG-C9 (75/25) | DEG-C8 (92/8) | PG-C8 (83/17) | EG-C8 (71/29) |
| Leveling agent (g) | 1.17 | 1.17 | 1.17 | 1.17 | 1.17 |
| Duraplus 2 (g) | 38.36 | 38.36 | 38.36 | 38.36 | 38.36 |
| E-4000 (g) | 6.84 | 6.84 | 6.84 | 6.84 | 6.84 |
| FS antifoam 013 (g) | 0.02 | 0.02 | 0.02 | 0.02 | 0.02 |
| Leveling performance | Good | Good | Good | Good | Average to good |

The components shown in Table 7 are as follows. Primal 1531B is an acrylic polymer emulsion made by Rohm and Haas Company; Lodyne S-100 is a fluorine surfactant made by Ciba Specialty Chemicals; Duraplus 2 is an acrylic polymer emulsion made by Rohm and Haas Company; E-4000 is a wax emulsion made by Toho Chemical Industry Co., Ltd.; FS Antifoam 013 is an antifoaming agent made by Dow Corning Corporation; EG-C9 is a mixture of the isononanoic acid monoester of ethylene glycol and the isononanoic acid diester of ethylene glycol; PG-C9 is a mixture of the isononanoic acid monoester of propylene glycol and the isononanoic acid diester of propylene glycol; DEG-C8 is a mixture of the octylic acid monoester of diethylene glycol and the octylic acid diester of diethylene glycol; PG-C8 is a mixture of the octylic acid monoester of propylene glycol and the octylic acid diester of propylene glycol; and EG-C8 is a mixture of the octylic acid monoester of ethylene glycol and the octylic acid diester of ethylene glycol.

The leveling performance in Working Examples 7 through 10 was "good" and the leveling performance in Working Example 11 was "average to good." In contrast to this, the leveling performance was "poor to average" in Comparative Example 1, which was a floor coating composition that did not contain a leveling agent, as shown in Test 1. This indicates that the leveling performance was improved by the esters used in Working Examples 7 through 11. Moreover, the leveling performance was "good" in Comparative Example 2, which used the conventional tributoxyethyl phosphate leveling agent, as shown in Test 2, but taking into consideration the amount of the monoester form used in Working Examples 7 through 10, it is clear that there was an advantage in that the same effect was realized with less leveling agent in the working examples. The leveling performance of Working Example 11 was somewhat inferior to that of Comparative Example 2, but this appeared to be because Working Example 11 used a small amount of 8 in the same order as shown in Table 8 under stirring. Stirring was continued for one hour after all the components had been added to prepare the floor coating composition. The leveling properties of the composition were evaluated. The composition and leveling properties of Working Examples 12 through 16, as well as Comparative Examples 7 and 8 are shown in Table 8.

Working Example 12 used 1.80 g of an ester mixture of 82 mol % of the isononanoic acid monoester of ethylene glycol and 18 mol % of the isononanoic acid diester of ethylene glycol (represented as EG-C9 in Table 8) as the leveling agent. Working Example 13 used 1.80 g of an ester mixture of 75 mol % of the isononanoic acid monoester of propylene glycol and 25 mol % of the isononanoic acid diester of propylene glycol (represented as PG-C9 in Table 8) as the leveling agent. Working Example 14 used 1.80 g of an ester mixture of 72 mol % of the isononanoic acid monoester of glycerol and 22 mol % of the isononanoic acid diester of glycerol and 4 mol % of the isononanoic triester of glycerol (represented as GL-C9 in Table 8) as the leveling agent. Working Example 15 used 1.80 g of an ester mixture at a ratio of 55 mol % of the isononanoic acid monoester of diethylene glycol, 17 mol % of the isononanoic acid diester of diethylene glycol, 13 mol % of the isononanoic acid monoester of trimethylolpropane, 11 mol % of the isononanoic acid diester of trimethylolpropane and 2 mol % of the isononanoic acid triester of trimethyloprpane (DEG-C9/TMP-C9 in Table 8) as the leveling agent. Working Example 16 used 1.80 g of an ester mixture with a ratio of 71 mol % of the octylic acid monoester of ethylene glycol and 29 mol % of the octylic acid diester of ethylene glycol (EG-C8 in Table 8) as the leveling agent. Comparative Example 7 did not use a leveling agent. Comparative Example 8 used 1.80 g of tributoxyethyl phosphate as the leveling agent.

TABLE 8

| Floor Coating Composition | Working Example 12 | Working Example 13 | Working Example 14 | Working Example 15 | Working Example 16 | Comparative Example 7 | Comparative Example 8 |
|---|---|---|---|---|---|---|---|
| Water (g) | 39.08 | 39.08 | 39.08 | 39.08 | 39.08 | 39.08 | 39.08 |
| Lodyne S-100 (g) | 1.40 | 1.40 | 1.40 | 1.40 | 1.40 | 1.40 | 1.40 |
| Diethylene glycol monoethyl ether (g) | 7.50 | 7.50 | 7.50 | 7.50 | 7.50 | 7.50 | 7.50 |
| Dipropylene glycol monomethyl ether (g) | 1.74 | 1.74 | 1.74 | 1.74 | 1.74 | 1.74 | 1.74 |
| Leveling agent (%) | EG-C9 (82/18) | PG-C9 (75/25) | GL-C9 (72/22/4) | DEG-C9/TMP-C9 (55/17/13/11/2) | EG-C8 (71/29) | None | Tributoxyethyl phosphate |
| Leveling agent (g) | 1.80 | 1.80 | 1.80 | 1.80 | 1.80 | 0 | 1.80 |
| JP308 (g) | 38.67 | 38.67 | 38.67 | 38.67 | 38.67 | 38.67 | 38.67 |
| E-4000 (g) | 7.07 | 7.07 | 7.07 | 7.07 | 7.07 | 7.07 | 7.07 |
| Primal 1531B (g) | 2.72 | 2.72 | 2.72 | 2.72 | 2.72 | 2.72 | 2.72 |
| FS antifoam 013 (g) | 0.02 | 0.02 | 0.02 | 0.02 | 0.02 | 0.02 | 0.02 |
| Leveling performance | Good | Good | Good | Good | Average to good | Poor to average | Good |

The components in Table 8 are as follows: Primal 1531B is an acrylic polymer emulsion made by Rohm and Haas Company; Lodyne S-100 is a fluorine surfactant made by Ciba Specialty Chemicals; JP308 is an acrylic polymer emulsion made by Rohm and Haas Company; E-4000 is a wax emulsion made by Toho Chemical Industry Co., Ltd.; FS Antifoam 013 is a defoaming agent made by Dow Corning; EG-C9 is a mixture of the isononanoic acid monoester of ethylene glycol and the isononanoic acid diester of ethylene glycol; PG-C9 is a mixture of the isononanoic acid monoester of propylene glycol and the isononanoic acid diester of propylene glycol; GL-C9 is a mixture of the isononanoic acid monoester of glycerol, the isononanoic acid diester of glycerol, and the isononanoic acid triester of glycerol; DEG-C9/TMP-C9 is a mixture of the isononanoic acid monoester of diethylene glycol, the isononanoic diester of diethylene glycol, the isononanoic acid monoester of trimethylol propane, the isononanoic acid diester of trimethylolpropane, and the isononanoic acid triester of trimethylolpropane; and EG-C8 is a mixture of the octylic acid monoester of ethylene glycol and the octylic acid diester of ethylene glycol.

The leveling performance in Working Examples 12 through 15 was "good," and the leveling performance in Working Example 16 was "average to good." In contrast to this, the leveling performance was "poor to average" in Comparative Example 7, which was a floor coating composition that did not contain a leveling agent, as previously described. This shows that the esters that were used in Working Examples 12 through 16 improved the leveling performance, even if the polymer solids content was changed. Moreover, the leveling performance was "good" in Comparative Example 8, which used a conventional tributoxyethyl phosphate leveling agent, but even though the total amount of ester was the same in Working Examples 12 through 15, when considered in terms of the amount of active ingredient, it was clear that there is an advantage in that the same effect is realized with a smaller amount of leveling agent. Furthermore, although the leveling performance of Working Example 16 was slightly inferior to that of Comparative Example 8, this appeared to be due to the fact that the amount of the active ingredient needed to improve the leveling performance was small in Working Example 16. Moreover, mopping performance, glass, and heel mark resistance were evaluated in Working Example 12 and were all "good."

It was clear from the results of Working Example 14 that the C9 aliphatic monocarboxylic acid monoester and diester of a triol participates in improving the leveling performance of a floor coating composition. It was also clear from the results of Working Example 15 that the simultaneous use of a C9 aliphatic monocarboxylic acid monoester of a diol and a C9 aliphatic monocarboxylic acid monoester and diester of a triol participates in improving the leveling performance of a floor coating composition.

We claim:
1. A floor coating composition, comprising;
    1) an aqueous suspension or dispersion of one or more water-insoluble emulsion polymers having acid functional residues;
    2) a (C7-C10) aliphatic monocarboxylic acid monoester of a diol, or a (C7-C10) aliphatic monocarboxylic monoester or diester of a triol; and
    3) optionally, a polyvalent metal ion or complex cross-linking agent.
2. The floor coating composition according to claim 1, wherein the aliphatic monocarboxylic acid is a (C8-C9) aliphatic monocarboxylic acid.
3. The floor coating composition according to claim 1, wherein the diol is selected from the group consisting of ethylene glycol, diethylene glycol, and triethylene glycol; and the triol is selected from the group consisting of glycerol and trimethylol propane.
4. The floor coating composition according to claim 1, containing 0.005 to 50 weight parts of 1) a (C7-C10) aliphatic monocarboxylic acid monoester of a dial or 2) a (C7-C10) aliphatic monocarboxylic monoester or diester of a triol, based on 100 weight parts of polymer solids in the floor coating composition.
5. A method for improving the leveling performance of a floor coating composition comprising an aqueous suspension or dispersion of one or more water-insoluble emulsion polymers having acid functional residues and, optionally, a polyvalent metal ion or complex cross-linking agent, comprising adding to the floor coating composition 1) a (C7-C10) aliphatic monocarboxylic acid monoester of a dial or 2) a (C7-C10) aliphatic monocarboxylic acid monoester or diester of a triol.

* * * * *